(12) United States Patent
Hastings

(10) Patent No.: US 7,538,779 B2
(45) Date of Patent: May 26, 2009

(54) METHOD OF RENDERING PIXEL IMAGES FROM ABSTRACT DATASETS

(75) Inventor: Allen Hastings, Los Altos Hills, CA (US)

(73) Assignee: Luxology, LLC, San Mateo, CA (US)

( * ) Notice: Subject to any disclaimer, the term of this patent is extended or adjusted under 35 U.S.C. 154(b) by 63 days.

(21) Appl. No.: 11/486,339

(22) Filed: Jul. 13, 2006

(65) Prior Publication Data

US 2007/0024639 A1    Feb. 1, 2007

Related U.S. Application Data

(60) Provisional application No. 60/704,695, filed on Aug. 1, 2005.

(51) Int. Cl.
*G06T 5/00* (2006.01)
(52) U.S. Cl. ..................................... 345/611
(58) Field of Classification Search ............... None
See application file for complete search history.

(56) References Cited

U.S. PATENT DOCUMENTS

| | | | | |
|---|---|---|---|---|
| 5,122,783 A | * | 6/1992 | Bassetti, Jr. ................. | 345/88 |
| 5,123,085 A | * | 6/1992 | Wells et al. ................. | 345/421 |
| 5,673,376 A | * | 9/1997 | Ray et al. .................... | 345/427 |
| 5,818,456 A | * | 10/1998 | Cosman et al. ............. | 345/614 |
| 5,977,987 A | * | 11/1999 | Duluk, Jr. .................... | 345/441 |
| 5,990,904 A | * | 11/1999 | Griffin ......................... | 345/631 |
| 6,057,855 A | * | 5/2000 | Barkans ....................... | 345/629 |
| 6,211,882 B1 | * | 4/2001 | Pearce et al. ................ | 345/419 |
| 6,317,525 B1 | * | 11/2001 | Aleksic et al. .............. | 382/299 |
| 6,501,483 B1 | * | 12/2002 | Wong et al. .................. | 345/611 |
| 6,828,983 B1 | * | 12/2004 | Vijayakumar et al. ....... | 345/613 |
| 6,961,045 B2 | * | 11/2005 | Tsao ............................ | 345/103 |
| 7,106,326 B2 | * | 9/2006 | Deering et al. .............. | 345/426 |
| 7,280,120 B2 | * | 10/2007 | Ecob et al. .................. | 345/611 |
| 7,319,467 B2 | | 1/2008 | Weyrich et al. | |
| 7,423,645 B2 | * | 9/2008 | Dougherty et al. .......... | 345/426 |
| 2002/0101435 A1 | * | 8/2002 | Sasaki et al. ................. | 345/611 |
| 2003/0038798 A1 | * | 2/2003 | Besl et al. .................... | 345/420 |
| 2004/0145599 A1 | * | 7/2004 | Taoka et al. ................. | 345/698 |

OTHER PUBLICATIONS

Liu et al. Antialiasing by Gaussian Integration. IEEE Computer Graphics and Applications. May 1996. vol. 16. No. 3. pp. 58-63.*
Bergman et al. Image Rendering by Adaptive Refinement. ACM SIGGRAPH Computer Graphics. Aug. 1986. vol. 20. Issue 4. pp. 29-37.*
Schilling. A New Simple and Efficient Antialiasing with Subpixel Masks. ACM SIGGRAPH Computer Graphics. Jul. 1991. vol. 25. issue 4. pp. 133-141.*
Mitchell et al. Reconstruction Filters in Computer Graphics. ACM SIGGRAPH Computer Graphics. Aug. 1988. vol. 22. Issue 4. pp. 221-228.*

* cited by examiner

*Primary Examiner*—Peter-Anthony Pappas
(74) *Attorney, Agent, or Firm*—Gordon & Rees, LLP

(57) ABSTRACT

A method of rendering pixels from an abstract dataset, by: selecting a collection of sub-pixel locations for a plurality of pixels; sampling dataset properties at the selected sub-pixel locations; merging the properties of more than one of the selected sub-pixel locations; and calculating pixel values based upon the merged properties at the selected sample locations.

20 Claims, 8 Drawing Sheets

METHOD OF RENDERING PIXEL IMAGES FROM ABSTRACT DATASETS

RELATED APPLICATION

The present application claims priority under 35 U.S.C. Section 119 to U.S. Provisional patent application 60/704, 695, entitled "Animation Software", filed Aug. 1, 2005.

TECHNICAL FIELD

The present invention relates to systems for rendering pixel images from abstract datasets, including 2D, 3D, volumetric and algorithmic datasets.

BACKGROUND OF THE INVENTION

A variety of systems currently exist for rendering computer animation images. Such systems have their disadvantages. The most common disadvantages of such systems are that they require very large amounts of computer resources, and are thus slow to operate. This is due to the fact that these systems typically perform a high number of data calculations for each of the pixels in the rendered image.

In one system, 3D objects are projected onto pixels in multiple passes. In each pass the pixels are shaded with colors, and the colors are blended into an accumulation buffer. A number of passes are required over the data of each pixel such that effects such as antialiasing, soft shadows, motion blur and depth of field can be properly rendered. A disadvantage of this approach is that since each pixel is shaded during every pass, the rendering time increases linearly with the number of passes.

Alternatively, instead of shading each pixel during every pass, a "deferred sample" can be generated which contains the inputs needed for shading (e.g.: material properties, texture coordinates, surface normal, etc.). Each pixel in a deferred accumulation buffer stores a list of these samples. Before a new sample is added to a list, it is compared with the samples from a previous pass, and it belongs to the same material as the previous sample, the two samples may be combined (with their attributes e.g.: material properties, texture coordinates, surface normal, etc. averaged). Because samples belonging to matching materials have been combined, the number of shading evaluations required can be substantially reduced. Unfortunately, this system requires a lot of computer memory since the deferred samples may be quite large. A further problem with this system is aliasing. Specifically, jagged textures or shallow edges may result when combined samples within a pixel would have been textured or lit differently had they not been combined. Another problem, shared with the first system, is that filtering is limited to a box filter.

SUMMARY OF THE INVENTION

The present invention provides a method of rendering pixels from an abstract dataset, by: selecting a collection of sub-pixel locations for a plurality of pixels; sampling dataset properties at the selected sub-pixel locations; merging the properties of more than one of the selected sub-pixel locations; and calculating pixel values based upon the merged properties at the selected sample locations. The plurality of pixels may optionally be extracted from a rectangular bucket from a larger image frame buffer. Also, sampling dataset properties may be done by: determining the material properties at selected sub-pixel locations; storing material properties as pointers to material objects; and merging the material properties when the material pointers match.

In preferred aspects, merging the properties is accomplished by comparing properties at the selected sub-pixel locations within a pixel; and averaging property values if the property values match within a pre-determined threshold. Additionally, the properties may optionally be compared at selected sub-pixels locations both within a pixel and between neighboring pixels. Merging can also optionally be accomplished by sampling dataset properties with different time attributes at selected sub-pixel locations; and merging time attributes along with the property values.

In further aspects, the property values can be averaged when the property values match within certain pre-determined thresholds, and the sub-pixel locations are adjacent in screen space within a specified shading rate. This can also optionally be accomplished by comparing pixel values between adjacent pixels; merging properties at selected sub-pixel locations at a finer rate if the difference between adjacent pixel values exceeds a pre-determined threshold; and calculating pixel values based upon the merged properties at the finer rate.

In various aspects, sampling dataset properties may be done by scan converting of 2D or 3D dataset properties, ray tracing of 3D dataset properties, or baking from UV coordinates of 3D surface dataset properties.

Pixel values may be calculated by computing pixel values for a plurality of merged properties in a pixel; associating computed pixel values with selected sub-pixel locations; and then filtering pixel values at selected sub-pixel locations using a high-quality image reconstruction filter.

An advantage of the present invention is that it can calculate different pixel values at different shading rates.

Another advantage of the present invention is that it can be used on any dataset including, but not limited to, 2D, 3D, volumetric and algorithmic datasets

DETAILED DESCRIPTION OF THE DRAWINGS

The present invention provides a method of rendering pixels from an abstract dataset, by: selecting a collection of sub-pixel locations for a plurality of pixels; sampling dataset properties at the selected sub-pixel locations; merging the properties of more than one of the selected sub-pixel locations; and calculating pixel values based upon the merged properties at the selected sample locations.

Figure 1:
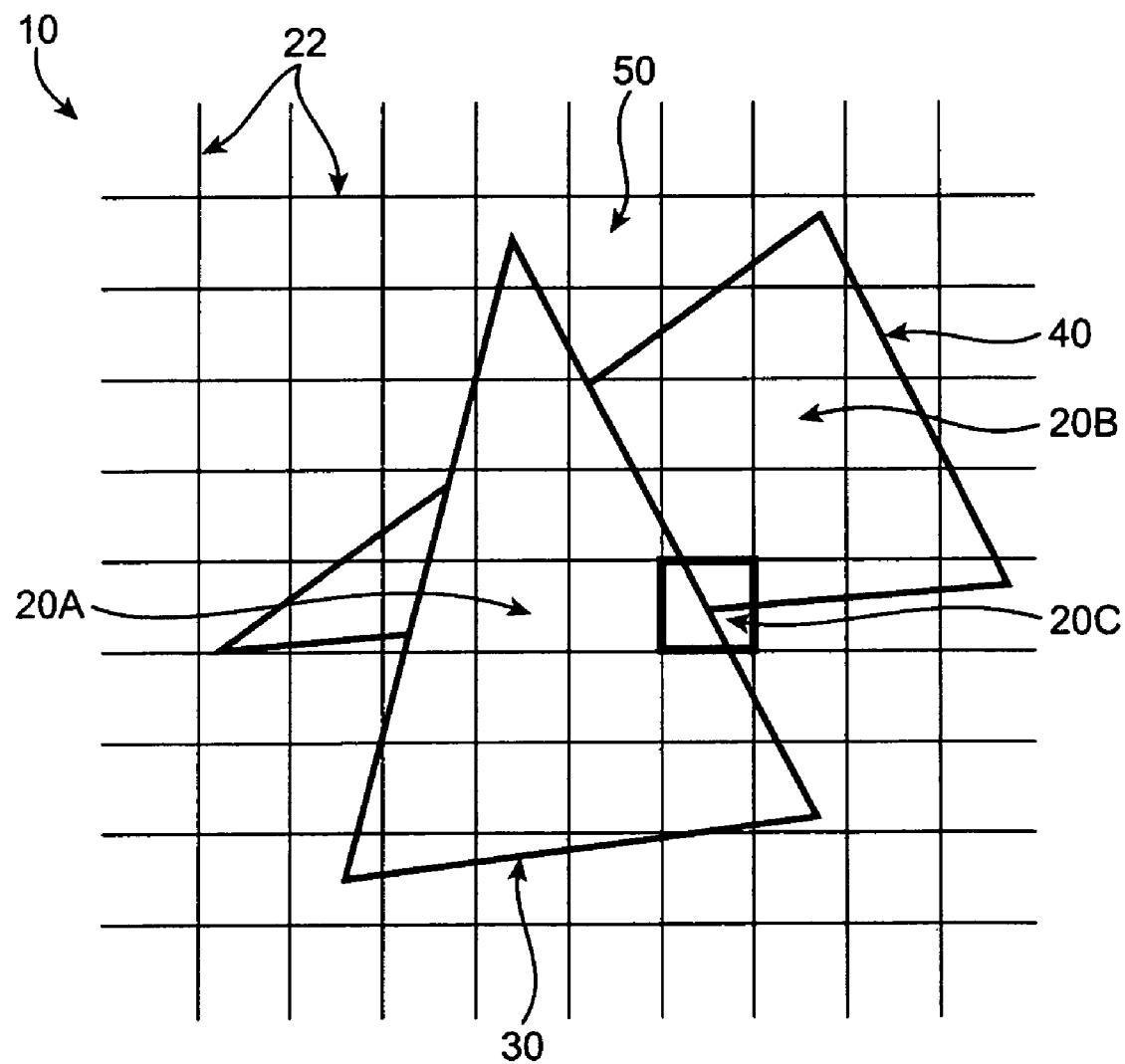
FIG. 1 is a representation of two objects projected onto a frame buffer, showing pixels and pixel boundaries.
Figure 2:
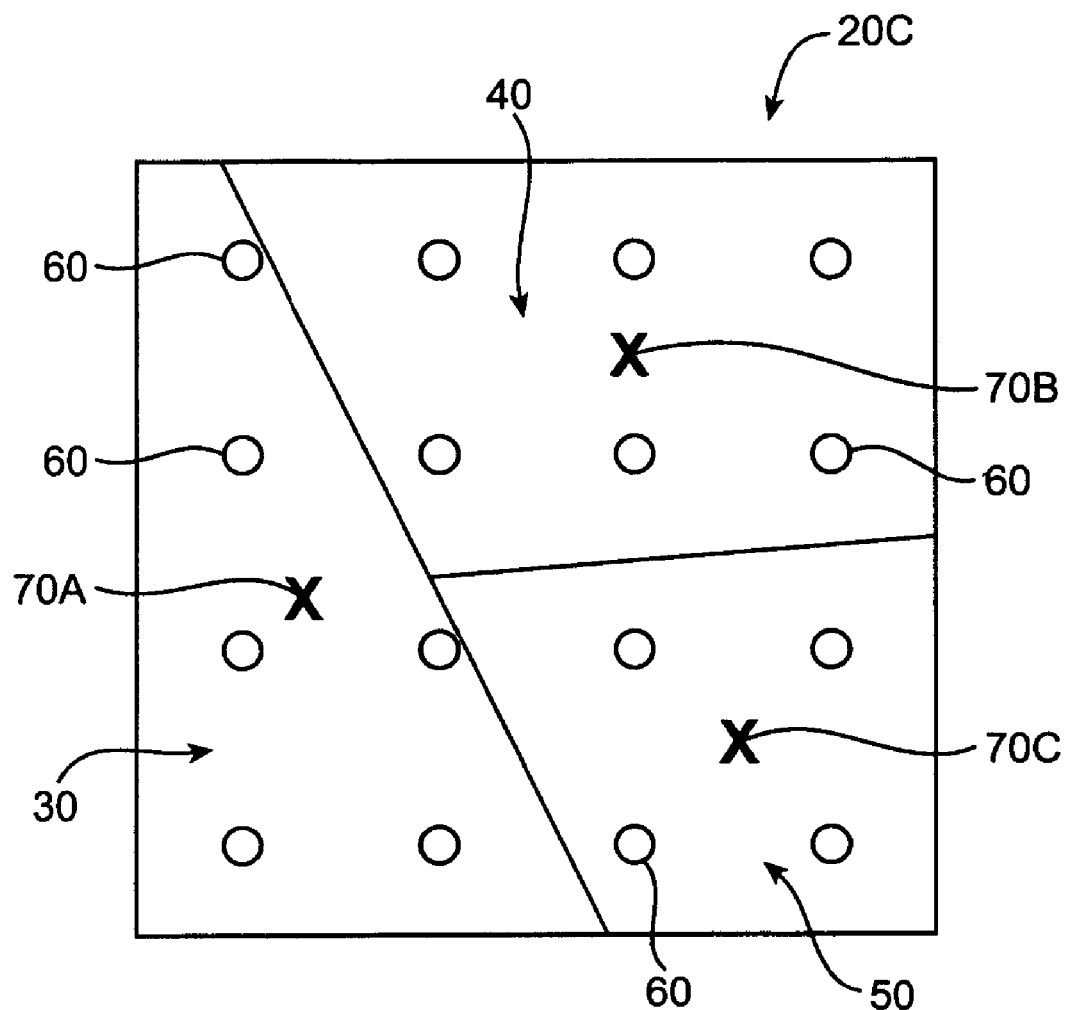
FIG. 2 is a close up view of one of the pixels in FIG. 1, showing a plurality of sub-pixel locations for which data is stored.
Figure 3:
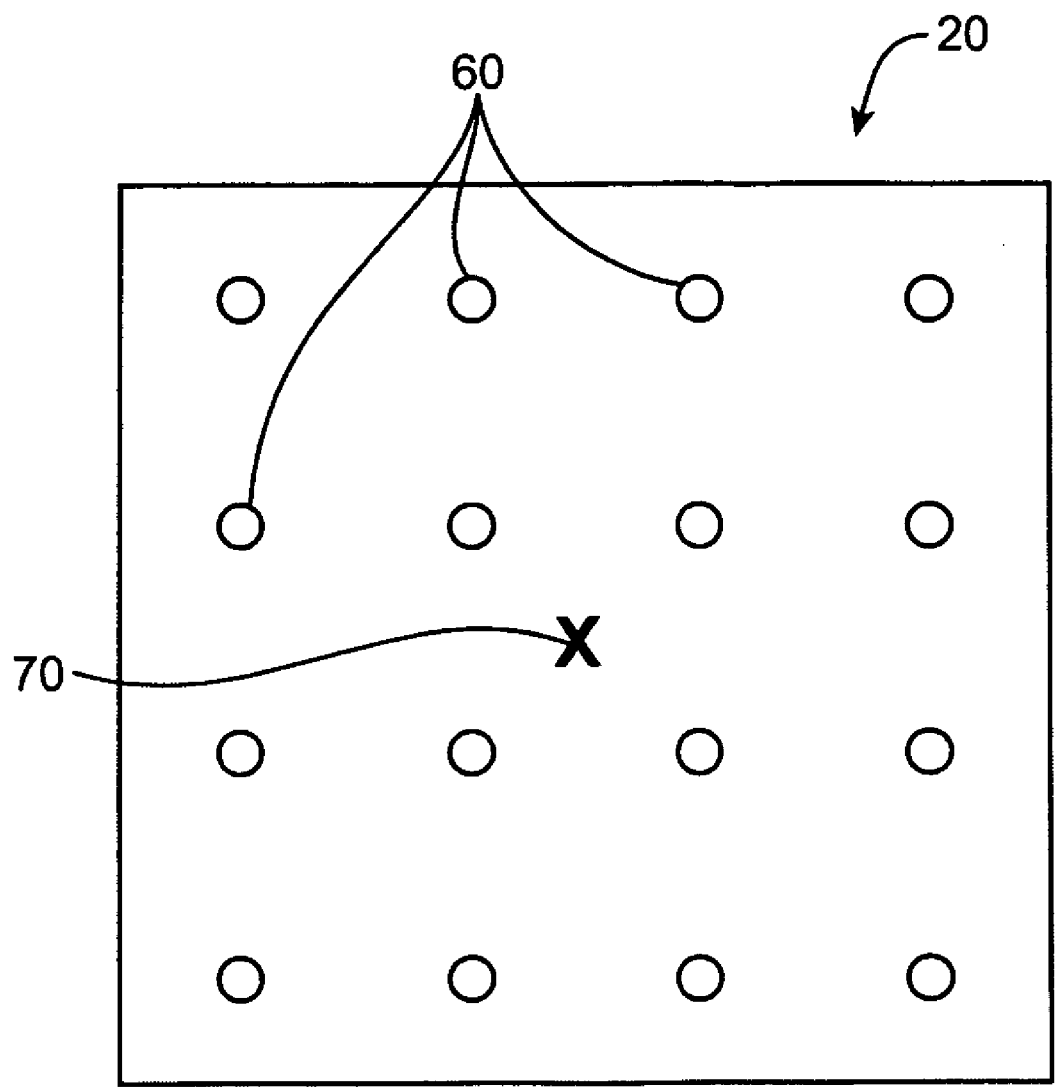
FIG. 3 is an example of coarse shading showing a close up view of a pixel with properties merged at one sample location.
Figure 4:
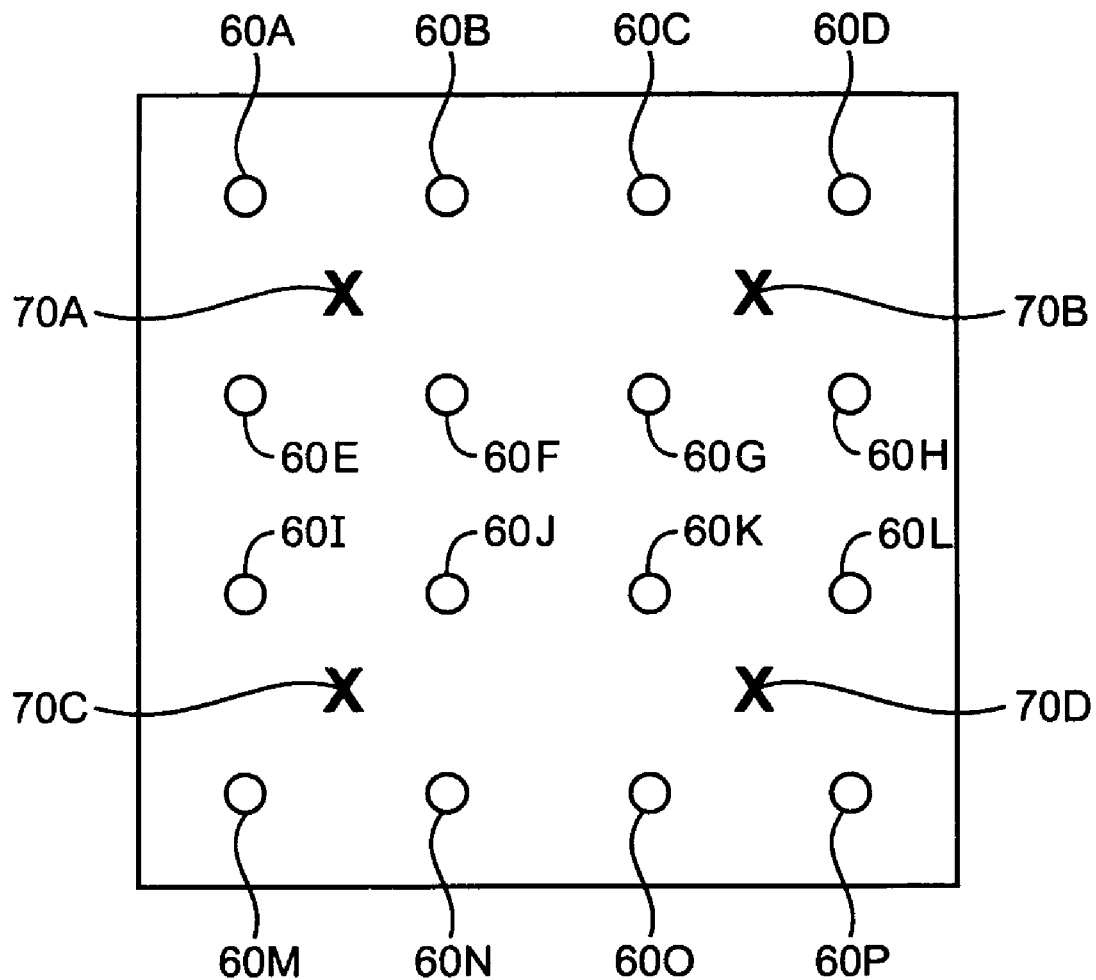
FIG. 4 is an example of intermediate shading showing a close up view of a pixel with properties merged at four sample locations.
Figure 5:
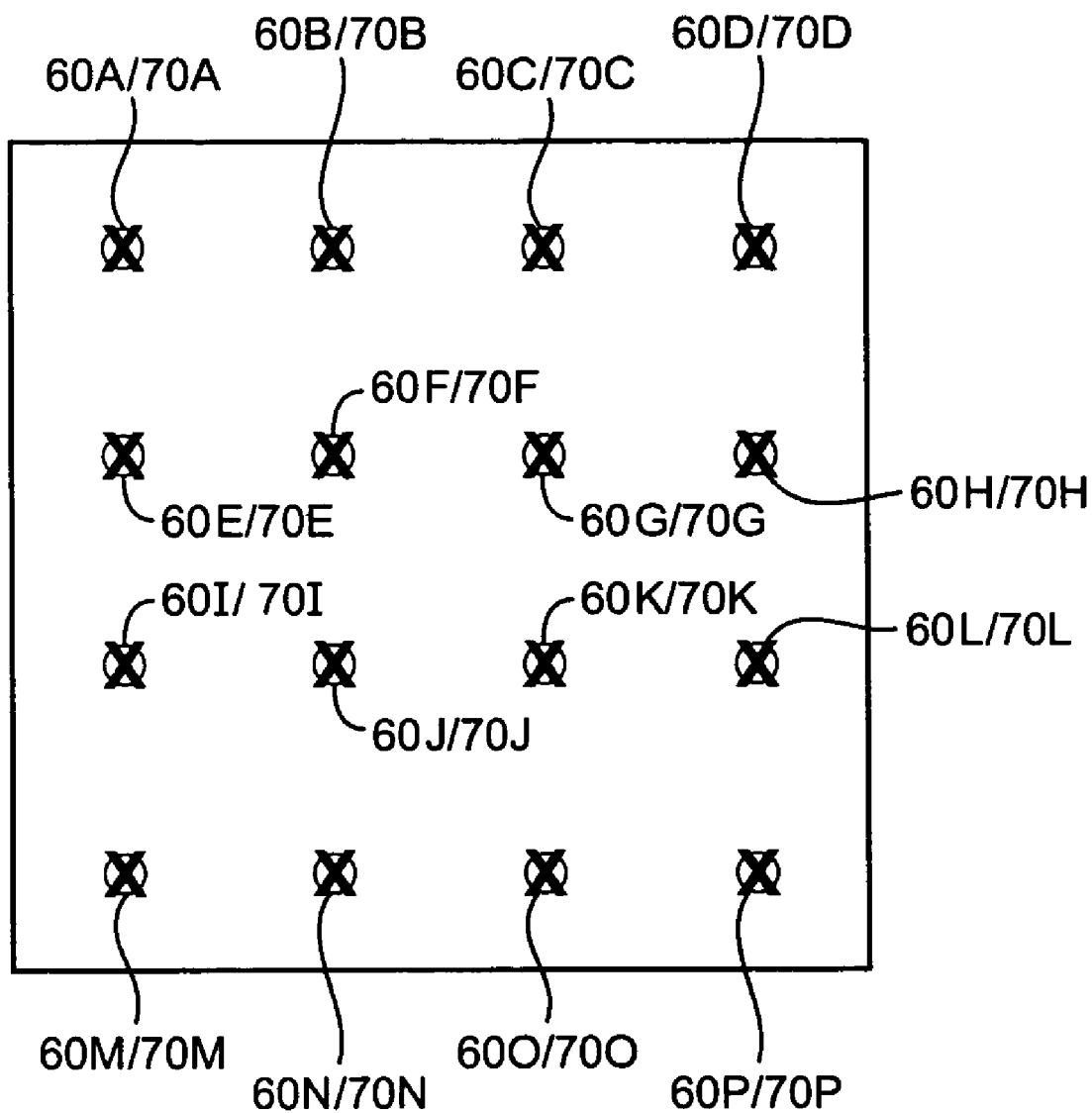
FIG. 5 is an example of fine shading showing a close up view of a pixel with properties merged at sixteen sample locations.

A preferred example of a system of shading a pixel in accordance with the present invention is shown in FIGS. 1 and 2. FIGS. 3 to 5 show various examples of coarse, intermediate and fine shading techniques performed in accordance with the present invention, as follows:

FIG. 1 shows a pixel buffer or bucket 10 that is subdivided into a plurality of pixels 20. Pixels 20 are separated by pixel borders 22. On pixel buffer 10 are projected two triangular shaped objects 30 and 40 against a background 50.

With existing systems, rendering such an image has proven to be easier at some pixel locations than at others. For example, pixel 20A is located fully within on screen object 30. Thus, if object 30 is red, pixel 20A will be displayed as red. Similarly, pixel 20B is located fully within on screen object 40. Thus, if object 40 is green, pixel 20B will be displayed as green. However, pixel 20C has proven to be more complicated to render since both objects 30 and 40 and background 50 all occur within pixel 20C. The resulting image may appear aliased (boxy or jagged) if the overlap of different objects and materials in the pixel 20C are not properly accounted for. Most approaches to high-quality rendering with existing systems take multiple samples within each pixel to attempt to estimate the "true" value of the pixel.

For example, a common approach to solving this problem has simply been to sub-divide the pixel into a variety of sub-pixel locations, calculate the shading at each of these sub-pixel locations, and then store each pixel as an average of all the sub-pixel results. This has the advantage of producing a visually appealing image (since jagged edges where on screen objects meet are substantially reduced). However, this has the disadvantage of requiring extremely large computer resources because many of the contributions to each pixel are virtually the same.

Another approach has been tried that reduces the computer time required but also has limitations. In this method the sub-pixel locations are first sampled just to determine which objects are present in each pixel. If there is only one object covering the whole pixel it is only shaded once. If there are several objects in the pixel, such as pixel 20C, then multiple shading computations are done and they are combined using a weighted average. This works well for object boundaries but it cannot deal with aliasing due to texture or lighting changes. Both of these methods are limited to box filtering.

Examples of these existing difficulties can be understood more clearly by referring to FIG. 2, as follows. FIG. 2 illustrates a close up view of pixel 20C (from FIG. 1), showing the boundaries between objects 30 and 40 and background 50. In accordance with above described prior art methods, pixel 20C could be shaded by separately calculating the shading attributes at a number of sub-pixel locations 60 and averaging the results. This approach has the advantage of producing a finely detailed image. However, this approach has the disadvantage of consuming significant computer resources since the properties of pixel 20C are separately calculated at (for example) sixteen different sub-pixel locations 60. (It is to be understood that the number "sixteen" of sub-pixel locations 60 is merely illustrative since more or less sub-pixel locations may instead be used). The problem of consuming significant computer resources becomes increasingly cumbersome since the properties of each one of pixels 20 are calculated at "sixteen" sub-pixel locations 60. Working with such large amounts of data becomes increasingly cumbersome when multiple passes through the data are required by the image rendering program.

The above problems are overcome in accordance with the present invention, as follows.

In accordance with the present invention, properties (including, but not limited to shading, lighting and texture properties) at each of the various sub-pixel locations 60 are merged (in a variety of different and novel ways) prior to calculating the shading and rendering the image for the pixel. This novel approach has the advantage of providing very fine object resolution (especially at object and shading boundaries) while still conserving computer resources, as follows.

Referring to FIG. 2, the present invention first determines the property data at each of the sixteen sub-pixel locations 60. Next, the data from various sub-pixel locations 60 is merged in a novel approach. For example, the data at each of the sub-pixel locations 60 within object 30 can be merged and assigned a sample location 70A. Similarly, the data at each of the sub-pixel locations 60 within object 40 can be merged and assigned a sample location 70B. Similarly, the data at each of the sub-pixel locations 60 within background 50 can be merged and assigned a sample location 70C. The exact positions (as well as the other properties) of sample locations 70A, 70B and 70C can be determined by averaging the data for the various sub-pixel locations 60 that are merged into them. For example, sample location 70A can be determined by the merged data of the six sub-pixel locations 60 within object 30, etc. In other words, selecting a number of sample locations 70 in a pixel 20 may be done by first selecting a number of objects (e.g.: objects 30 and 40 and background 50) in pixel 20; and then associating the sample locations 70A, 70B and 70C with the selected objects (30, 40 and 50).

In accordance with the present invention, pixel 20C can then be rendered by using only the three sets of data for each of sample locations 70A, 70B and 70C. As can be appreciated, computer resources are conserved since only three sets of data (i.e. data for sample locations 70A, 70B and 70C) are used to render pixel 20C. In contrast, some prior art systems may use sixteen data sets (i.e.: a separate data sets for each of locations 60) when rendering pixel 20. In contrast to existing systems, however, the present invention stores the data for each of the plurality of sub-pixel locations 60 such that data can be merged differently for these sub-pixel locations 60 under different criteria. Thus, the data in each pixel (or groups of pixels) can be merged differently under different conditions, as desired. Thus, different criteria can be used for merging, and re-merging problem areas and for filtering sub-pixel samples to render a final image of the pixel.

As such, the present invention renders pixels from an abstract dataset, by: selecting a collection of sub-pixel locations 60 for a plurality of pixels 20; sampling dataset properties at the selected sub-pixel locations 60; merging the properties of more than one of the selected sub-pixel locations 60 (i.e.: into locations 70); and then calculating pixel values based upon the merged properties at the selected sample locations 70. In optional embodiments, pixels 20 may be extracted from a rectangular bucket from a larger image frame buffer. In addition, more than one bucket can optionally be processed at a time using multiple processors. In addition, it is possible to combine multiple passes over the same bucket having different initial conditions. This is particularly useful when dealing with effects like depth-of-field, which varies a camera position slightly, averaging the results. If desired, only a selected sub-set of sub-pixel locations 60 can be sampled for each bucket pass.

In accordance with the present invention, the sub-pixel locations 60 may be positioned based on various patterns across the pixel as seen in each of FIGS. 2 to 5. In certain preferred aspects of the invention, the properties of sub-pixel locations 60 can be merged only if they are adjacent at threshold distances in 2 dimensional screen space, as shown in FIGS. 3 to 5, as follows. These threshold distances may be selected (i.e. pre-set or pre-determined) by the animator, as desired. Specifically, as will be illustrated below, fine (i.e.

short threshold distances) or coarse (longer shading distances) may be set by the animator as desired. Thus, the properties of sub-pixel locations 60 can be merged by comparing properties at the selected sub-pixel locations 60 within a pixel 20; and then averaging property values if the property values match within a pre-determined threshold. For example, the properties of various sub-pixel locations 60 can be merged if the sub-pixel locations 60 are adjacent in screen space and within a specified shading rate. The shading rate determines whether sub-pixel locations 60 that are close in screen space can be merged. For example, a shading rate of 1.0 can allow all of the sub-pixel locations 60 in a single pixel to be merged, whereas a shading rate of 0.5 can allow sub-pixel locations 60 if they are no farther apart than one half of pixel 20 to be merged (resulting in 4 merged locations 70 per pixel), etc. In an optional embodiment, it is possible to allow shading rates greater than 1.0, in which case sub-pixel samples from adjacent pixels can be merged resulting in greater time savings at the expense of image quality.

In one aspect of the invention, pixel values that result from initial shading may be compared to neighboring pixels to find areas of high contrast. This can be useful in finding pixels that are much brighter or darker than the pixels next to them, which are potential areas of texture aliasing. Specifically, if a pixel has values that differ beyond a pre-determined threshold with its neighbor pixels, there may be some details that were not captured when using a high shading rate. In accordance with the present invention, it is possible to re-visit the pixel again and merge at a lower shading rate, thereby capturing more detail. This is a unique advantage of storing all the sub-pixel properties even after initial shading.

Figure 6:
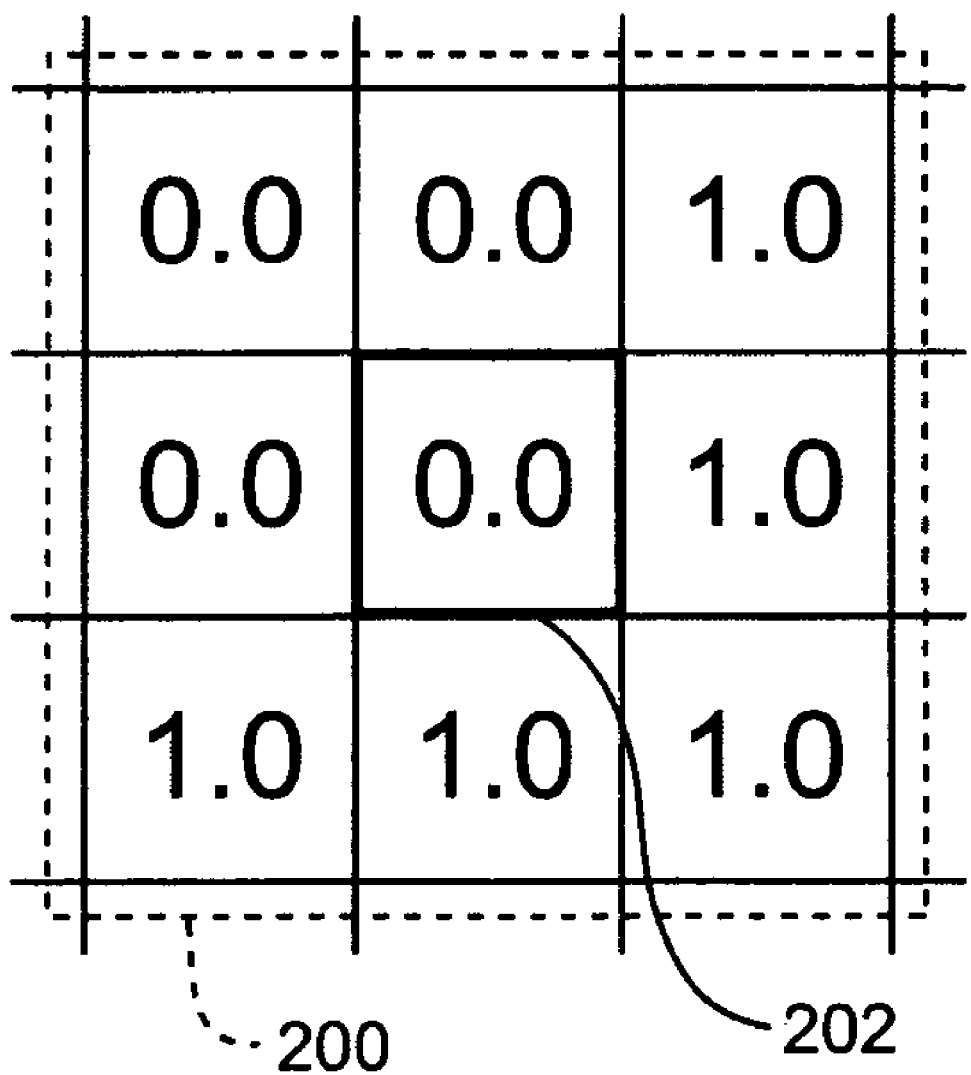
FIGS. 6-8 are an example of adaptive refinement based on initial pixel values and merging at a finer shading rate.
Figure 7:
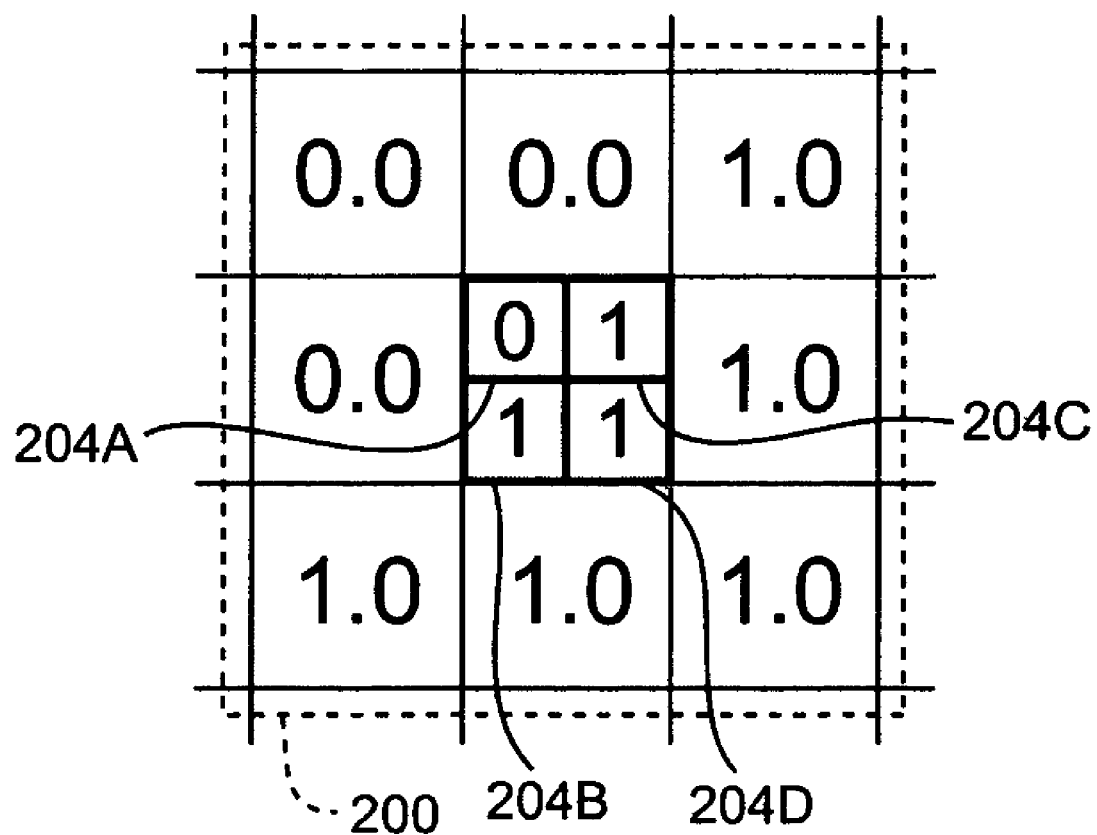
Figure 8:
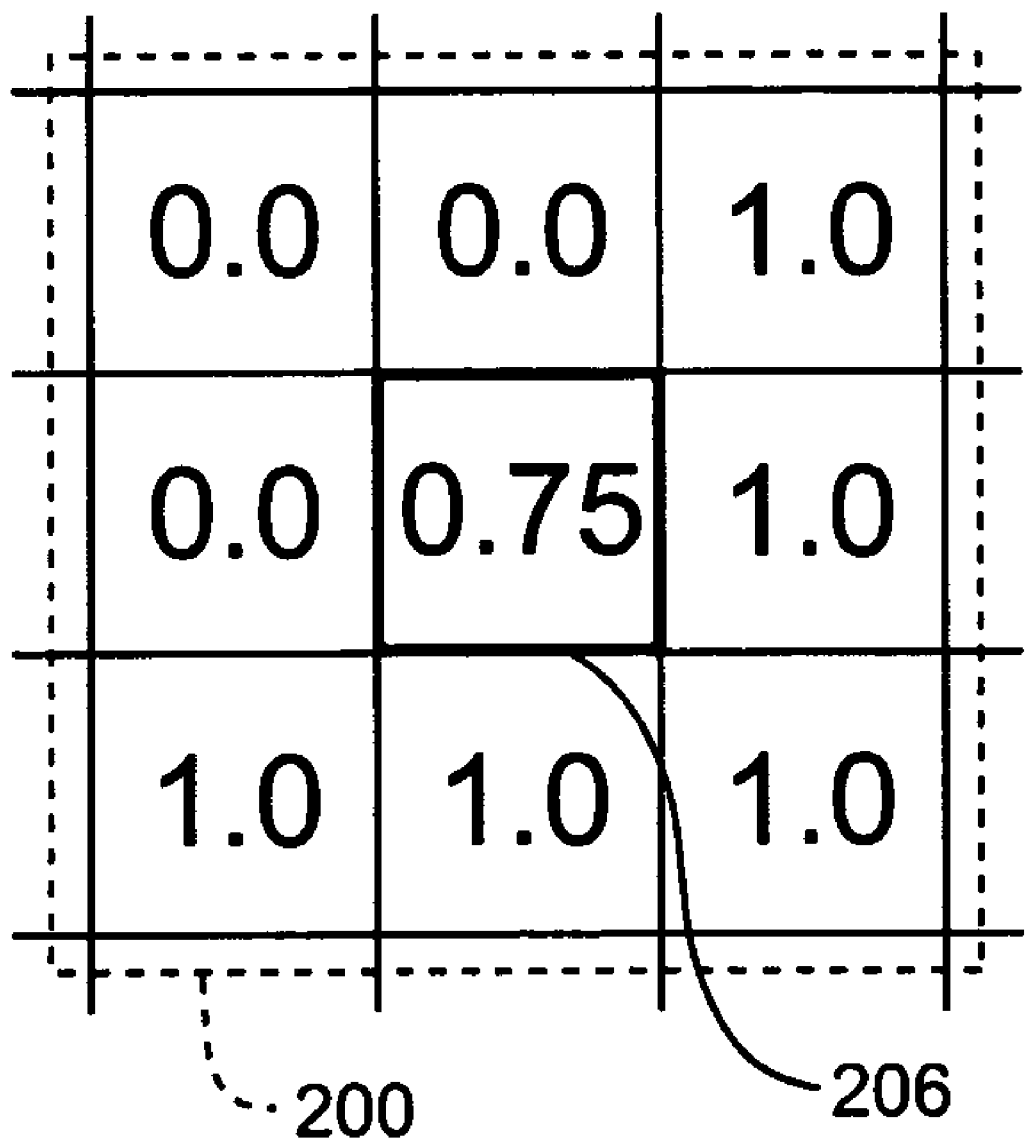

For example, FIGS. 6-8 show adaptive refinement based on areas of high contrast. FIG. 6 illustrates a 3×3 region of nine pixels 200 where a single scalar pixel value has been computed at an initial coarse shading level (perhaps "shadow density" or "green color component"). The center pixel 202 of this 3×3 kernel has a value which varies by a difference greater than a pre-determined threshold from its neighbors. That is, it has a pixel value of 0.0 and at least one of its neighbors has a pixel value of 1.0. Because of this difference it requires adaptive refinement. FIG. 7 shows that the central pixel has been re-merged at a finer shading rate, resulting in four distinct merged samples (204A, 204B, 204C, 204D) within the pixel, each with a new pixel value. FIG. 8 shows the result of averaging the pixel values at the finer shading rate at pixel 206.

A unique advantage of the present invention is that pixels may be re-shaded at a finer level if required. For example, a pixel can be rendered once using coarse shading. If at a later stage of rendering more detail is needed (such as if the pixel lies at a high-contrast border in the image) the samples may be rendered a second time using a finer shading rate. This is due to the fact that the present invention retains the data for each of sub-pixel locations 60 when performing the rendering of the pixel.

FIG. 3 shows an example of coarse shading. In pixel 20A, shown here, all the samples come from object 30, and so all can be merged together based on the normal merging criteria prior to rendering. Specifically, the properties of each of the sixteen sub-pixel locations 60 are merged as a single data set represented at sample location 70. Thus, only one data set is used to render pixel 20 in FIG. 3.

FIG. 4 shows an example of intermediate shading in which the user has set a threshold distance in screen space (i.e.: a pre-set minimum threshold between sample locations 70) which prevents samples from merging into one sample location 70 as was shown in FIG. 3. Specifically, the properties of each of the sixteen sub-pixel locations 60A to 60P are merged into four data sets for sample locations 70A to 70D, as follows. The properties for sub-pixel locations 60A, 60B, 60E and 60F are merged into a data set for sample location 70A. Similarly, the properties for sub-pixel locations 60C, 60D, 60G and 60H are merged into a data set for sample location 70B. Similarly, the properties for sub-pixel locations 60I, 60J, 60M and 60N are merged into a data set for sample location 70C. Similarly, the properties for sub-pixel locations 60K, 60L, 60O and 60P are merged into a data set for sample location 70D. Thus, four data sets are used to render pixel 20 in FIG. 4. As can be seen, the threshold distance criteria (separating locations 70) prevented all the samples 60 from being merged into one sample location 70 as was shown in FIG. 3.

FIG. 5 shows an example of fine shading. Here the threshold distance separating locations 70 has been set so low that no samples are allowed to merge. Specifically, the properties of each of the sixteen sub-pixel locations 60A to 60P are not merged, but instead correspond directly to individual data sets for each of sample locations 70A to 70P. Thus, sixteen data sets are used to render pixel 20 in FIG. 5. The shading rate may vary based on material, so that the artist may designate materials which need finer shading because of their finer texturing.

In various optional embodiments of the invention, the sampling of dataset properties at sub-pixel locations 60 may be performed by scan converting 2D or 3D datasets. In other optional embodiments of the invention, the sampling of dataset properties at sub-pixel locations 60 may be performed by ray tracing of 3D dataset properties. In still further optional embodiments of the invention, the sampling of dataset properties at sub-pixel locations 60 may be performed by baking from UV coordinates of 3D surface dataset properties.

Another advantage of this approach is that a coarse shading rate may be used to compute and display one property of the pixel whereas a finer shading rate may be used to compute and display another property of the pixel. Thus, different pixel values can be calculated at different shading rates. This allows the artist to determine which properties need to be computed at high quality and which other properties can be computed at a lower quality more quickly. Additionally, the different rates can be used to compute different sub-pixel properties before shading.

For example, in optional aspects of the present invention, a first set of properties for a first plurality of sub-pixel locations 60 can be merged into a first set of sample locations 70, and a second set of properties for a second plurality of sub-pixel locations 60 can be merged into a second set of sample locations 70, all within the same pixel 20. For example, a property such as "lighting" may be merged as shown in FIG. 3 (i.e.: the "lighting" properties of each of sub-pixel locations 60 can be merged into a single sample location 70) whereas another property such as "texture" may be merged as shown in FIG. 4 (i.e.: the "texture" properties of each of sub-pixel locations 60A to 60P can be merged into four sample locations 70A to 70D). In this example, the rendered pixel 20 will have a coarse lighting shading, and an intermediate texture shading. Other combinations are contemplated within the scope of the present invention.

In a further optional embodiment of the invention, pixel values can be calculated at a number of merged locations 70, and then filtered at these locations using a high-quality image reconstruction filter (such as Gaussian or Mitchell and Netravali). This is done by the following steps. First the system computes pixel values for all the pixels in a neighborhood of a pixel, the neighborhood size being based on the size of the high-quality image filter kernel. Then the pixel values from the computations are associated with the original positions of the sub-pixel samples. So if there were four sub-pixel samples that contributed to a merged location, there would be four sub-pixel samples with the same pixel values. Then a filter is applied as if each sub-pixel sample were shaded independently suing the high-quality image reconstruction filter.

This illustrates a further advantage of the present invention that, by retaining the data properties of each of sub-pixel locations 60, high quality image reconstruction filters can be used. For example, even though the color assigned to each of sample locations 70 may have been computed from a merged set of sub-pixel locations 60, individual filter weights can still be assigned to each of sub-pixel locations 60. In contrast, in pre-existing systems, the data at sub-pixel locations is lost, limiting the system to the use of box filters.

In other optional aspects of the invention, a pointer may be associated with the properties of the various of sub-pixel locations 60. Such pointer may optionally point to a property dataset such as a material dataset. This saves memory when dealing with large numbers of deferred samples. In further optional aspects, memory can be saved, and parallelism improved by dividing the render image into buckets. Thus, sampling dataset properties may be accomplished by: determining the material properties at selected sub-pixel locations 60; storing material properties as pointers to material objects; and then merging the material properties when the material pointers match one another.

In optional embodiments of the invention, a time coordinate may be added to each of sub-pixel locations 60. This would allow for the computation of time-varying shading. Specifically, the dataset properties can be calculated with different time attributes at selected sub-pixel locations 60, and then these properties can be merged along with the time attributes. Sampling the dataset at different times may also be useful when dealing with motion blur effects

What is claimed:

1. A method of rendering pixels from an abstract dataset, comprising:
   selecting a first collection of sub-pixel locations within a plurality of pixels, wherein the plurality of pixels are generated using at least one processor;
   sampling dataset properties at the selected sub-pixel locations;
   selecting a second collection of sub-pixel locations within the plurality of pixels, wherein said sub-pixel locations within the second collection are not the same as any of the sub-pixel locations within the first collection;
   merging the dataset properties of more than one of the selected sub-pixel locations within the first collection;
   storing the merged dataset properties at selected sub-pixel locations within the second collection;
   calculating pixel values based only upon the merged data properties stored at the sub-pixel locations within the second collection, wherein all sub-pixel locations are within the same plane.

2. The method of claim 1, wherein the plurality of pixels are extracted from a rectangular bucket from a larger image frame buffer.

3. The method of claim 2, further comprising:
   processing more than one bucket at a time using multiple processors.

4. The method of claim 2, further comprising:
   combining multiple passes over the same bucket with different initial conditions.

5. The method of claim 4, further comprising:
   sampling only a subset of the selected first collection of sub-pixel locations for each bucket pass.

6. The method of claim 1, wherein merging further comprises:
   comparing dataset properties at the selected first collection of sub-pixel locations within a pixel; and
   averaging dataset property values if the dataset property values match within pre-determined thresholds.

7. The method of claim 1 wherein merging further comprising:
   comparing dataset properties at the selected first collection of sub-pixel locations between neighboring pixels; and
   averaging dataset property values if the property values match within pre-determined thresholds.

8. The method of claim 6 or 7, wherein the sub-pixel locations are adjacent in screen space within a specified shading rate.

9. The method of claim 8, further comprising:
   calculating different pixel values at different shading rates.

10. The method of claim 8, further comprising:
    comparing pixel values between adjacent pixels;
    merging properties at the selected first collection of sub-pixel locations at a finer rate if the difference between adjacent pixel values exceeds a pre-determined threshold; and
    calculating pixel values based upon the merged properties at the finer rate.

11. The method of claim 6 or 7, further comprising:
    sampling dataset properties with different time attributes at the selected first collection of sub-pixel locations; and
    merging time attributes along with the property values.

12. The method of claim 1, wherein sampling dataset properties comprises:
    scan converting of 2D or 3D dataset properties.

13. The method of claim 1, wherein sampling dataset properties comprises:
    ray tracing of 3D dataset properties.

14. The method of claim 1, wherein sampling dataset properties comprises:
    baking from UV coordinates of 3D surface dataset properties.

15. The method of claim 1, wherein calculating pixel values further comprises:
    computing pixel values for a plurality of the merged dataset properties in a pixel;
    associating computed pixel values with the selected second collection of sub-pixel locations; and
    filtering pixel values at the selected second collection of sub-pixel locations using a high-quality image reconstruction filter.

16. The method of claim 1, wherein sampling dataset properties comprises:
    determining the dataset properties at the selected first collection sub-pixel locations;
    storing the dataset properties as pointers to material objects; and
    merging the dataset properties when the material pointers match.

17. The method of claim 1, wherein positions of the second collection of sub-pixel locations are determined, at least in part, by the data that are merged and stored at the locations.

18. The method of claim 17, wherein the data are merged by averaging the data.

19. The method of claim 1, wherein calculating pixel values based upon the merged dataset properties at the selected second collection of sub-pixel locations comprises calculating shading and rendering for the pixel.

20. The method of claim 1, wherein the positions of the first collection of sub-pixel locations are determined prior to sampling the dataset.

* * * * *